(12) United States Patent
Heimann

(10) Patent No.: US 7,021,100 B2
(45) Date of Patent: Apr. 4, 2006

(54) DEEP-ROLLING APPARATUS OF A DEEP ROLLING MACHINE CRANKSHAFTS

(75) Inventor: Alfred Heimann, Aachen (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 0 days.

(21) Appl. No.: 10/752,418

(22) Filed: Jan. 5, 2004

(65) Prior Publication Data

US 2005/0144999 A1  Jul. 7, 2005

(51) Int. Cl.
*B21O 15/00* (2006.01)

(52) U.S. Cl. .......................... 72/110; 72/118

(58) Field of Classification Search ............... 72/107, 72/110, 101, 118, 121

See application file for complete search history.

(56) References Cited

U.S. PATENT DOCUMENTS

| 6,094,956 A * | 8/2000 | Vodopyanov et al. ......... 72/110 |
| 6,434,992 B1 * | 8/2002 | Vodopyanov ................. 72/110 |
| 6,619,090 B1 * | 9/2003 | Heffe ........................... 72/110 |
| 6,691,543 B1 * | 2/2004 | Steffens et al. ............... 72/110 |

* cited by examiner

*Primary Examiner*—Ed Tolan
(74) *Attorney, Agent, or Firm*—Proskauer Rose LLP

(57) ABSTRACT

The present invention relates to the deep rolling apparatus (8) of a deep rolling machine 1 for crankshafts (3) in which two arms (9, 10) across from each other support a deep rolling head (13) or a support roller head (14). The support roller head (14) has two support rollers (21, 22) with parallel axes and the deep rolling head (13) has two work rollers (23, 24) entering the radii or fillets of the main bearing or crank pin journals or journals of the crankshafts (3). In one embodiment of the deep rolling apparatus (8) in scissor-like construction an axial guide roller (27) is provided on the deep rolling head (13) and is centered relative to the deep rolling head (13), its axis of rotation being perpendicular to the axis of rotation of the crankshaft (3). The axial guide roller (27) has a diameter that is slightly smaller than the distance between two oil collars (25, 26) of a main crank pin journal (5) of the crankshaft.

4 Claims, 6 Drawing Sheets

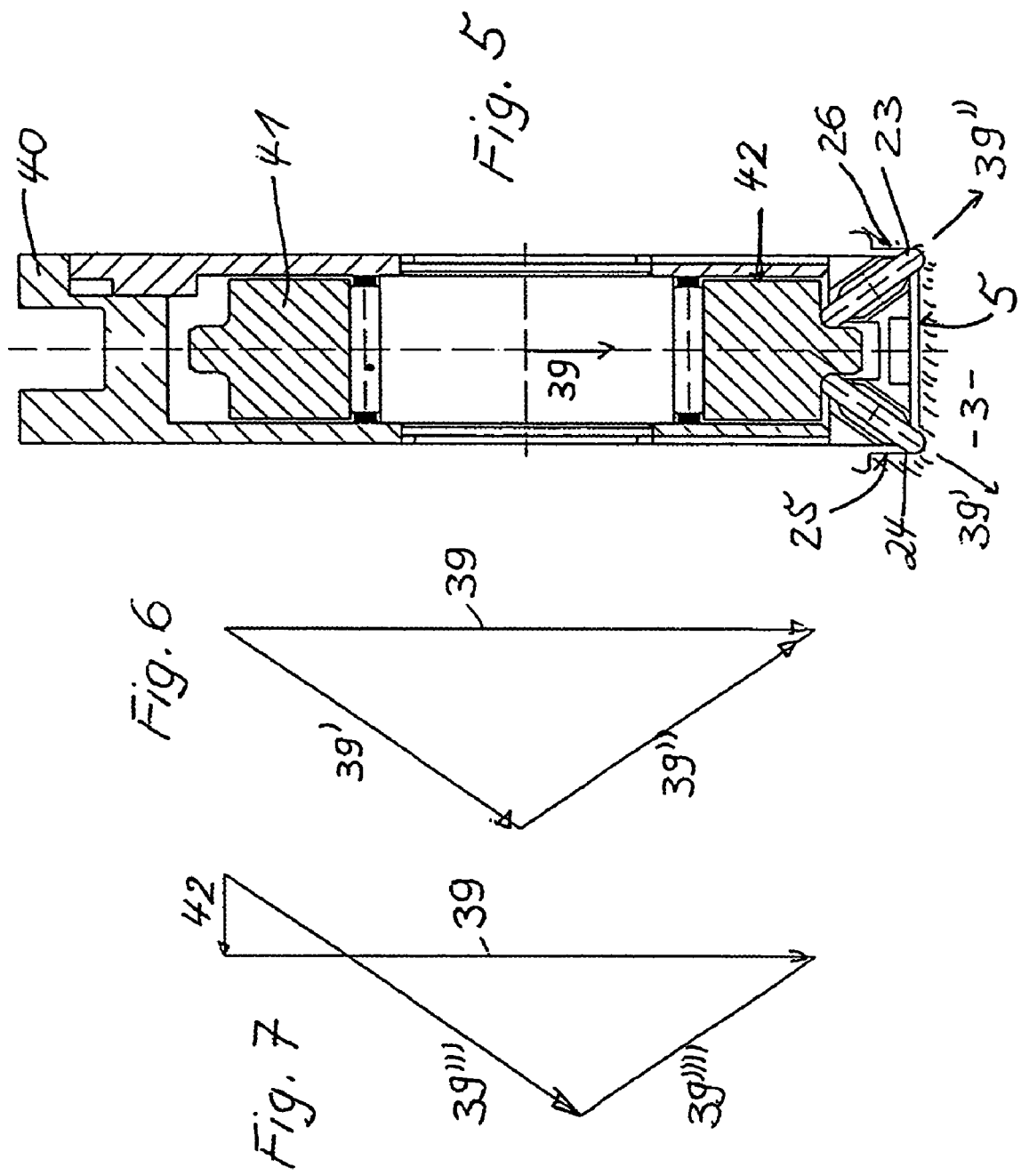

DEEP-ROLLING APPARATUS OF A DEEP ROLLING MACHINE CRANKSHAFTS

BACKGROUND OF THE INVENTION

The present invention relates to a deep rolling apparatus of a deep rolling machine for crankshafts where two arms across from each other support a deep rolling head or a support roller head, whereby the support roller head is provided with two support rollers with parallel axes and the deep rolling head with at least one work roller whose axis of rotation is in the same plane as the axis of rotation of the crankshaft and forms an angle with it, with a driving device that produces the closing and opening motion of the deep rolling apparatus well as the deep rolling force.

A deep rolling apparatus of this type is known e.g. from DE 299 10 214.9 and DE 202 00 926.2. In either case the patents deal with deep rolling apparatuses provided with devices to avoid a collision of the tools with the oil collars of the pin journals of the crankshaft. Normally, two work rollers are installed in pairs and at a distance from each other in a deep rolling head and enter the radii or annular fillets between the pin journals and the webs of the crankshaft under the action of the deep rolling force while the crankshaft rotates around its axis of rotation. The axes of rotation of the two work rollers lay in the same plane as the axis of rotation of the crankshaft or are slightly offset relative to the axis of rotation of the crankshaft. The work rollers are inclined outward in relation to the deep rolling head and form a sharp angle with the axis of rotation of the crankshaft.

Inside the deep rolling head the two work rollers bear on a back up roller that is mounted in the deep rolling head in such manner that it cannot take over any forces in the longitudinal direction of the crankshaft.

Support roller heads may develop forces in axial direction, e.g. when the axis of one of the two support rollers of a support roller head is not exactly parallel with the axis of rotation of the crankshaft. In addition alignment errors in the alignment of the deep rolling head, run out of the crankshaft, conical bearing surfaces of the main or crank pin journals may provoke forces in axial direction, i.e. in the direction of the axis of rotation of the crankshaft that are undesirable due to incompatibility with a neat work result and the intensity of which depends on the intensity of the deep rolling force and the given conditions of friction.

SUMMARY OF THE INVENTION

This leads to the object of the present invention to provide a guiding system that is suitable to absorb forces emanating from the deep rolling apparatus or generated at the deep rolling apparatus in the axial direction and thus to improve the work results of deep rolling on the crankshaft.

According to the invention this object is attained by providing an axial guide roll, that is centered relative to the deep rolling head of a scissor-type deep rolling apparatus, having an axis of rotation perpendicular to the axis of rotation of the crankshaft and having a diameter that is slightly smaller than the space between two oil collars of a main or pin bearing journal of the crankshaft.

In one embodiment of the deep rolling apparatus of the less frequent compact design, whereby the two arms of the deep rolling apparatus are connected to each other via a yoke, an axial guide roller is installed on the yoke and is centered relative to the deep rolling head whose axis of rotation is perpendicular to the axis of rotation of the crankshaft and has a diameter that is slightly smaller than the space between two oil collars of a main or pin bearing journal of the crankshaft.

Since prevailing space availability usually does not permit a perpendicular positioning of the axial guide roller relative to the axis of rotation of the crankshaft, it is provided in another advantageous embodiment that the rotational axis of the axial guide roller forms a sharp angle with a plane containing the axis of rotation of the crankshaft and that it is at a distance from the common plane of the rotational axes of the to support rollers. In both embodiments an axial guide roller delimiting an axial movement of the deep rolling apparatus in the longitudinal direction of the axis of rotation of the crankshaft is permanently installed therefore on the deep rolling head or on the yoke and introduces forces acting in the same direction into the oil collar of the crankshaft. The positioning of the axial guide roller at a sharp angle does not affect the free space within the deep rolling machine which may also be required for the axial displacement of the crankshaft. The positioning instead provides free space at the top that is sufficient for the access of a measuring scanner that measures the uniform running of the crankshaft in a known manner before and after the deep rolling process.

Instead of a single axial guide roller, a pair of axial guide rollers is also provided, with axes of rotation parallel to each other and at a distance from each other. However the possibility is also provided for the axes of rotation of a pair of axial guide rollers to be offset when seen at an angle, perpendicularly to the axis of rotation of the crankshaft. Instead of axial guide rollers however, sliding bodies can also be provided in a known manner. Other advantageous embodiments are claimed in the dependent claims.

The invention is described in further detail through two examples of embodiments.

BRIEF DESCRIPTION OF THE DRAWINGS

FIG. 5 shows the cross-section through a deep rolling head, FIG. 6 shows the force parallelogram of uniform axial forces, FIG. 7 shows the force parallelogram of non-uniform axial forces and FIG. 8 shows a second embodiment of a deep rolling apparatus.

DETAILED DESCRIPTION OF THE INVENTION

Figure 1:
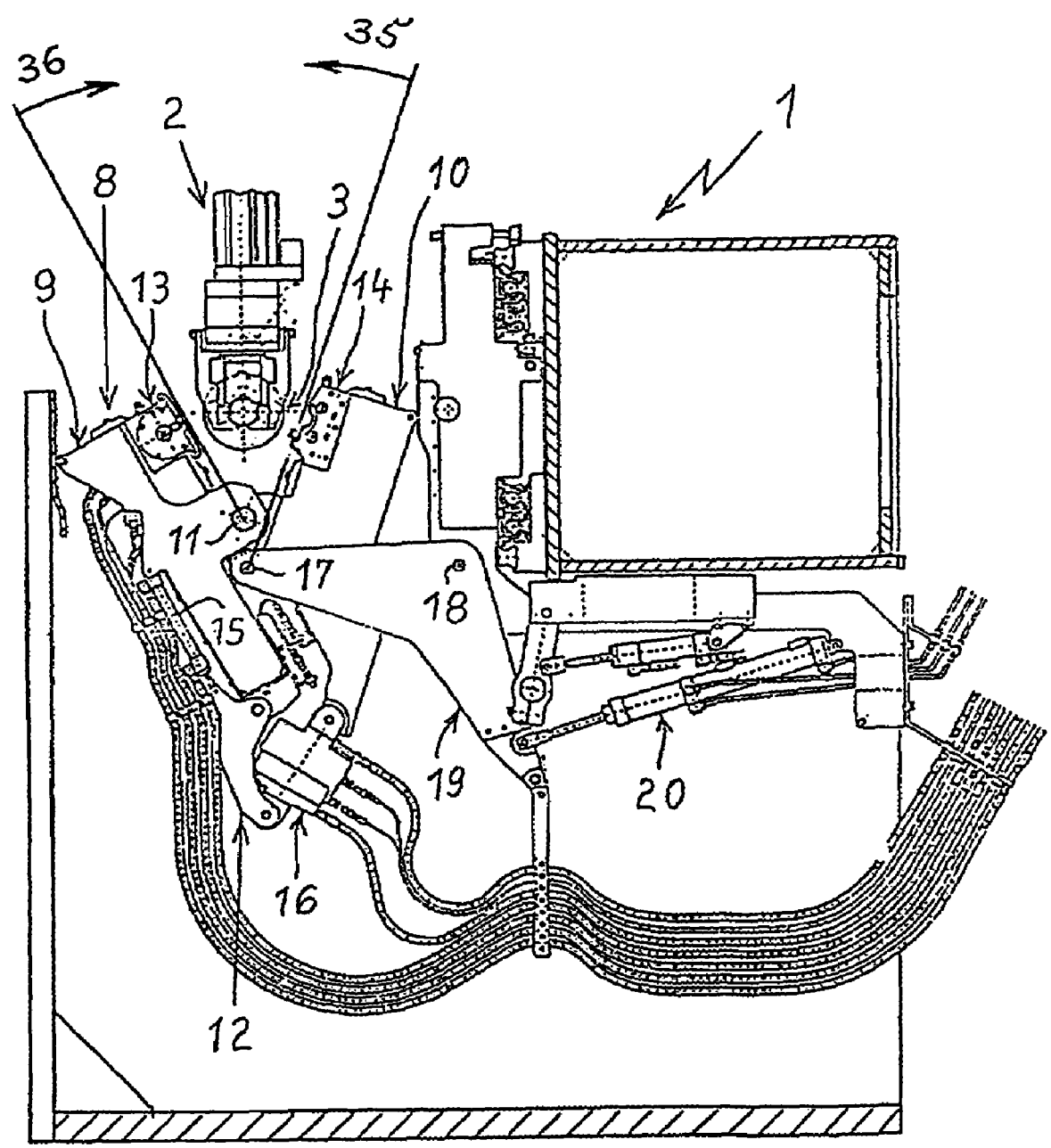
FIG. 1 shows a section through a deep rolling machine with a partial view of a crankshaft conveying device, whereby a deep rolling apparatus assumes its pre-closing position relative to a presented crankshaft.

A deep rolling machine 1 is designed with a driving device (not shown) to rotate a crankshaft 3 received from a crankshaft conveying device 2.

The driving device produces the rotational movement of the crankshaft 3 around its axis of rotation 4 during the deep rolling of the main pin journals 6 and crank pin journals 5. The axis of rotation 4 is thus located in the axis of rotation of the driving device.

The present description is limited to the deep rolling of one crank pin journal 5 of the crankshaft 3, since this is sufficient to explain the object of the invention. A deep rolling apparatus 8 of the scissor-type construction is provided with two scissor arms 9, 10, a scissor pivot point 11, a drive system 12, a deep rolling head 13 and a support roller head 14 in association with a crank pin axle journal 5. The drive system 12 is equipped with an adjusting cylinder 15 and a power device 16. The adjusting cylinder 15 generates the closing and opening movement of the deep rolling apparatus 8, the power device 16 produces the deep rolling force. The deep rolling apparatus 8 is hinged through a hinging point 17 to an angular lever 19 capable of swiveling around an axis 18. The angular lever 19 can be swiveled by means of a piston cylinder unit 20.

The deep rolling machine 1 is designed in such a manner that when the deep rolling apparatus 8 closes, at first the two support rollers 21, 22 of the support roller head 14 which have parallel axes and thereafter the two work rollers 23, 24 of the deep rolling head 13 come into contact with the crank pin journal 5.

Hereby the support roller head 14 executes a swiveling motion 35 around the hinging point 17 and the deep rolling head 13 a swiveling motion 36 around the scissor pivot point 11.

During the swiveling motions 35 or 36 of the support roller head 14 and the deep rolling head 13 in the closing direction, a collision with one of the two oil collars 25, 26 of the crank pin journal 5 is avoided because the deep rolling head 13 is provided with an axial guide roller 27 that is transversal and centered relative to the support rollers 21, 22 and has a diameter 28 greater than the width 29 of the deep rolling head 13 but slightly smaller than the space 29a between the oil collars 25, 26 of the crank pin journal 5.

The axial guide roller 27 is cylindrical on the outside. In the closed position of the deep rolling apparatus 8 FIG. 2 a clearance of approximately 0.25 mm is individually provided for the two free spaces 30, 31 between the oil collars 25, 26 and the axial guide roller 27.

The rotational axes 32 and 33 of the two support rollers 21 and 22 are in one and the same plane 34 which is at a distance s from a plane 38 containing the axis of rotation 4 of the crankshaft 3. The axis of rotation 7 of the axial guide roller 27 forms an sharp angle 37 with the plane 38 containing the axis of rotation 4 of the crankshaft 3, which is at a distance s from the common plane 34 of the axes of rotation 32 and 33 of the two support rollers 21 and 22 and is parallel.

Figure 2:
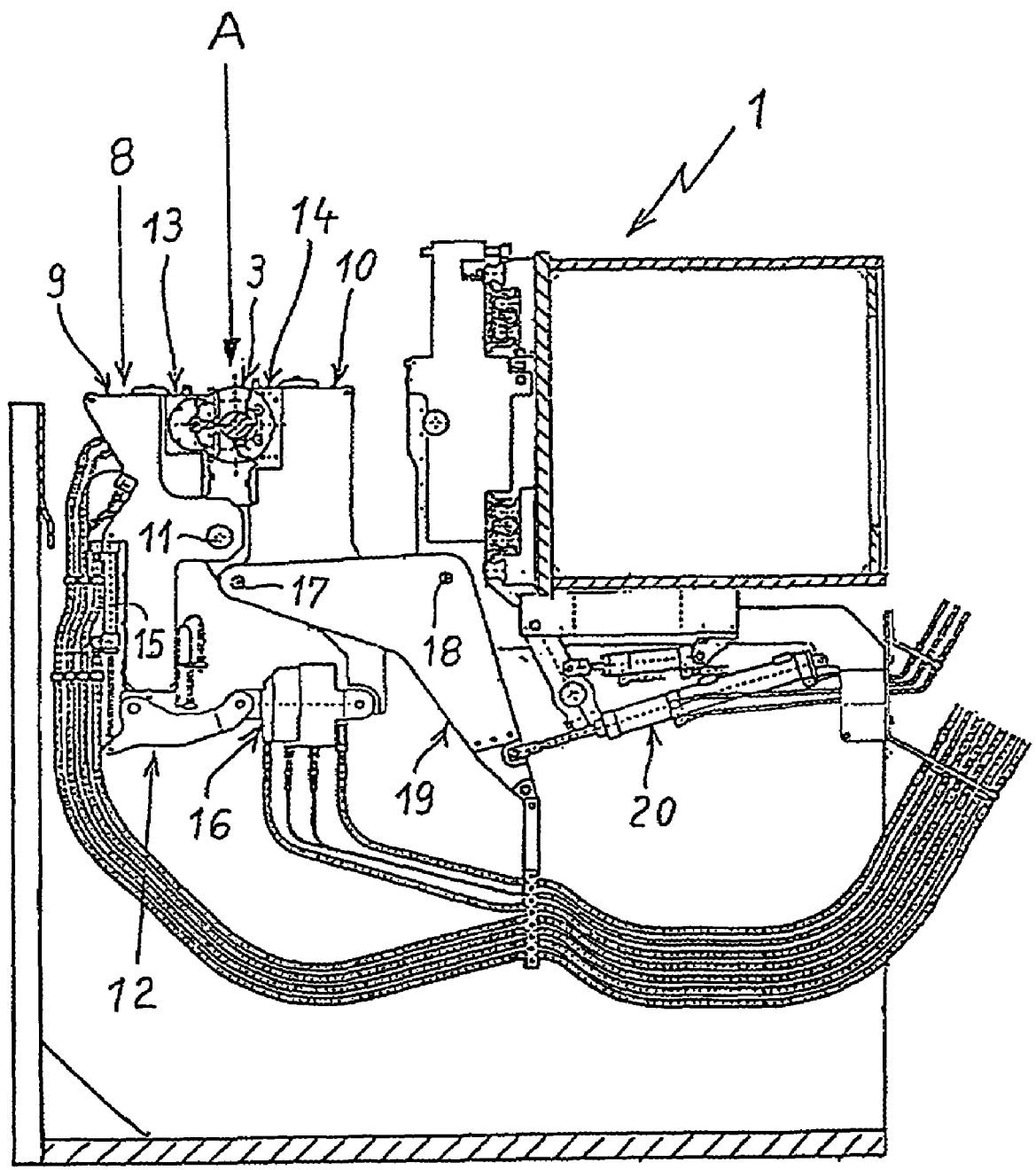
FIG. 2 shows a section through the deep rolling machine and a section through a main bearing journal of the crankshaft, whereby the deep rolling apparatus is in its closing position.
Figure 3:
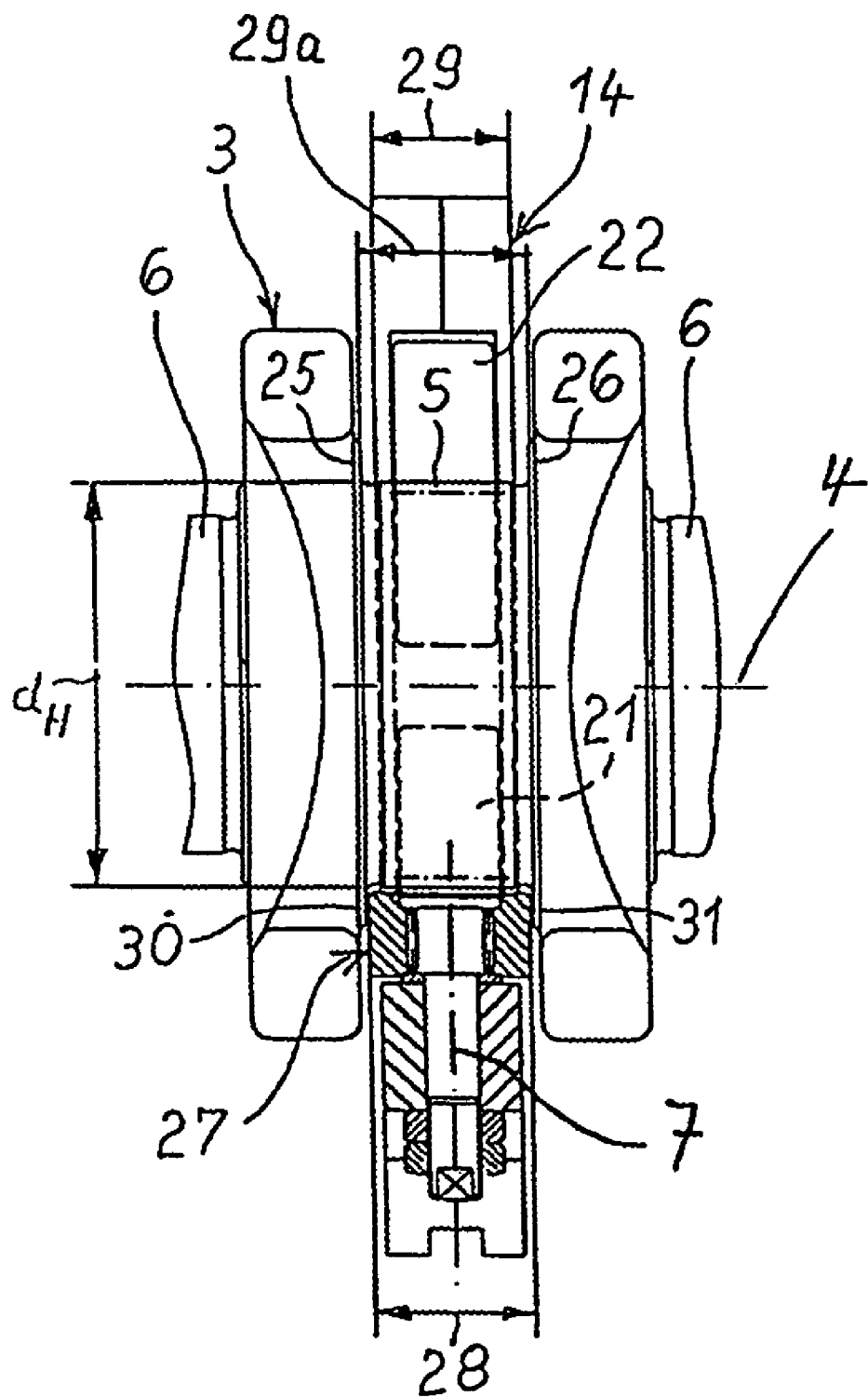
FIG. 3 shows a section along line IV—IV of FIG. 4.
Figure 4:
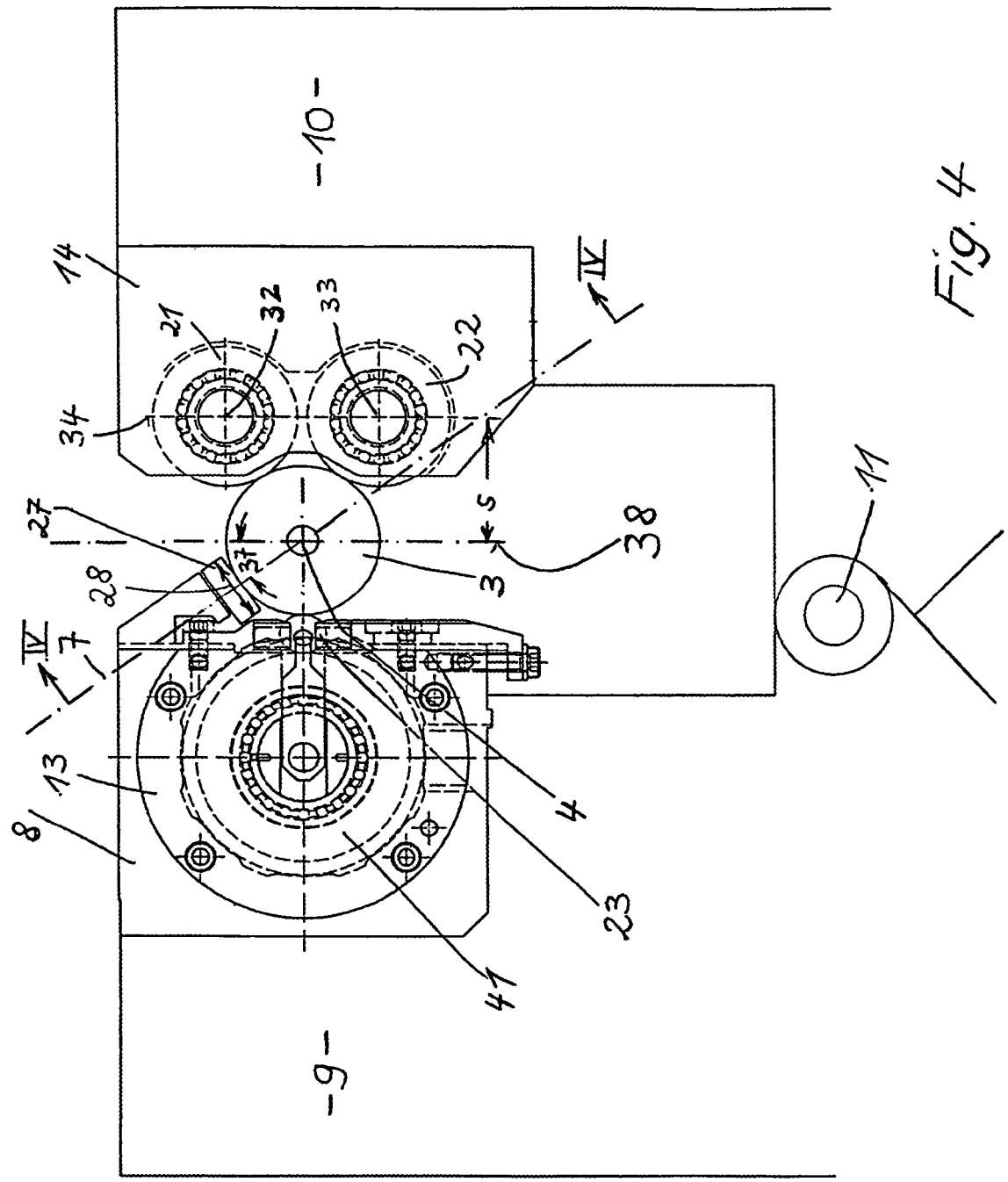
FIG. 4 shows the axial guide roller on a deep rolling apparatus designed by the scissor-type construction.

The deep rolling apparatus shown in FIG. 4 corresponds to the deep rolling apparatus as shown in FIGS. 1 and 2.

In the section through a deep rolling head as shown in FIG. 5, the deep rolling force 39 is exerted on the crankshaft 3 by the housing 40 via the back up roller 41 mounted rotatably therein and the work rollers 23 and 24. A representative force parallelogram is shown in FIG. 6 where the deep rolling force 39 is broken down into the two equal components 39' and 39".

If an axial interference force 42 is exerted upon the housing 40 of the deep rolling head 13, a force parallelogram such as in FIG. 7 is obtained. Therein the deep rolling force 39 is broken down into the two components 39''' and 39''''. The two components 39''' and 39'''' are obviously of different magnitude. Applied back to the section of FIG. 5 this means that the left work roller 24 exerts a greater force 39''' on the crankshaft 3 than the right work roller 23 with the component 39''''. The result of the deep rolling operation is accordingly different.

Figure 8:
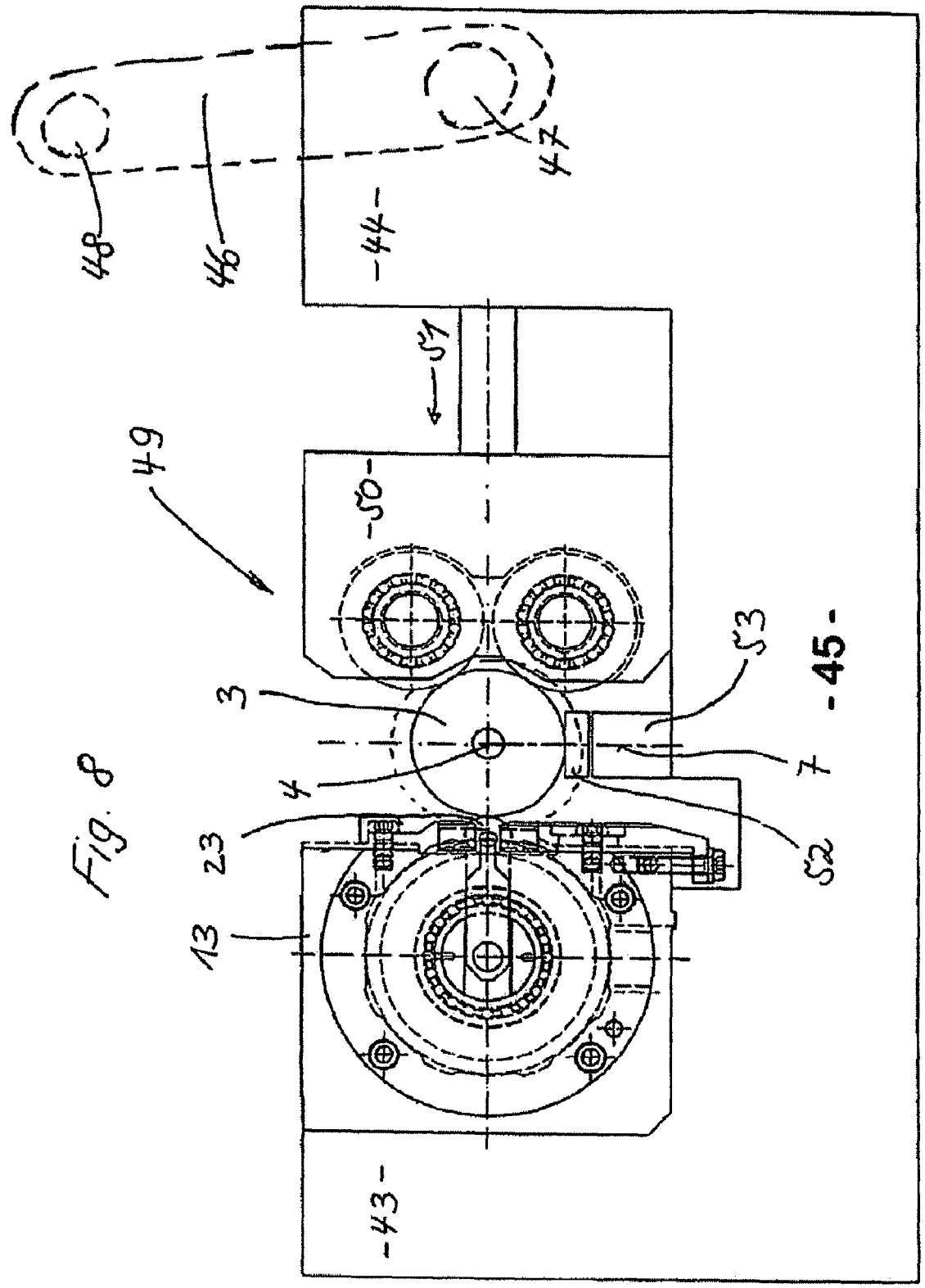

In FIG. 8 another embodiment of a deep rolling apparatus is shown. Instead of scissor arms as those on which the embodiment of FIGS. 1 to 4 is based, a deep rolling apparatus 49 in compact form is shown here. Accordingly, the two arms 43 and 44 are connected to each other via a yoke 45. A lever system 46 with two articulations 47 and 48 as well as with a corresponding drive (not shown) ensures the entering of the deep rolling apparatus 49 into its working position. While the deep rolling head 13 is connected in a known manner to arm 43, the support roller head 50 is moved by a drive 51 into an opening and closing position relative to the crankshaft 3. An axial guide roller 52 projects from the yoke 45 in the direction of the axis 4 of rotation of the crankshaft 3. The axial guide roller 52 is rotatably mounted in a base 53 on the yoke 45. The support of the axial guide roller 52 in the base 53 may either be rigid, as shown in FIG. 8, or may have its own drive (not shown) that is similarl to the drive 51 to bring the axial guide roller 52 into a closing and opening position.

Instead of individual axial guide rollers 27 or 52, sliding elements can be provided and these, without being themselves rotatable, can be introduced into the space 29a between the two oil collars 25 and 26. Instead of individual rollers 27 or 52, pairs of rollers with diameters 28 considerably smaller than shown in FIG. 8, but with outer circumferences sufficient to bridge the space 29a between the oil collars 25 and 26 can be provided. Here too, the principle applies again that instead of two individual axial guide rollers 27 or 52, sliding elements (not shown) are provided as known from DM GM 202 00 926.2.

Providing one axial guide roller 27, 52 on the deep rolling head 13 or on the yoke 45 of a deep rolling apparatus 8, 49 has the advantage over the known installation of one axial guide roller on the support roller head 14, that the axial guidance of the deep rolling apparatus 8, 49 relative to the crankshaft 3 can be more direct, so that possibly lacking rigidity in he device arm 9, 43 which supports the deep rolling head 13 as well as in the pivot point 11 between the two device arms 9, 10, 43, 44 can no longer affect the deep rolling results.

LIST OF REFERENCE NUMBERS

| | |
|---|---|
| 1 | Deep rolling machine |
| 2 | Crankshaft conveying device |
| 3 | Crankshaft |
| 4 | Rotational axis of the crankshaft |
| 5 | Crank pin |
| 6 | Main pin |
| 7 | Axis of rotation of the axial guide roller |
| 8 | Deep rolling apparatus |
| 9 | Scissor arm |
| 10 | Scissor arm |
| 11 | Scissor pivot point |
| 12 | Driving device |
| 13 | Deep rolling head |
| 14 | Support roller head |
| 15 | Adjusting cylinder |
| 16 | Force device |
| 17 | Hinging point |
| 18 | Axis |
| 19 | Angular lever |
| 20 | Piston-cylinder unit |
| 21 | Support roller |

| | -continued |
|---|---|
| 22 | Support roller |
| 23 | Work roller |
| 24 | Work roller |
| 25 | Oil collar |
| 26 | Oil collar |
| 27 | Axial guide roller |
| 28 | Diameter of the axial guide roller |
| 29 | Width of the support roller head |
| 29a | Space between the oil collars |
| 30 | Free space |
| 31 | Free space |
| 32 | Axis of the support roller |
| 33 | Axis of the support roller |
| 34 | Plane through axes 32 and 33 |
| 35 | Swivel motion, counterclockwise |
| 36 | Swivel motion, clockwise |
| 37 | Sharp angle |
| 38 | Plane |
| 39 | Deep rolling force |
| 39' | Component of the deep rolling force |
| 39'' | Component of the deep rolling force |
| 39''' | Component of the deep rolling force |
| 39'''' | Component of the deep rolling force |
| 40 | Housing |
| 41 | Back up roller |
| 42 | Axial interference force |
| 43 | Arm |
| 44 | Arm |
| s | Distance |
| 45 | Yoke |
| 46 | Lever system |
| 47 | Articulation |
| 48 | Articulation |
| 49 | Deep rolling apparatus |
| 50 | Support roller head |
| 51 | Drive |
| 52 | Axial guide roller |
| 53 | Base |

The invention claimed is:

1. Deep rolling apparatus of a deep rolling machine for crankshafts, in which two arms across from each other bear a deep rolling head or a support roller head, whereby the support roller is provided with two support rollers with parallel axes and the deep rolling head with at least one work roller whose axis of rotation has the same direction as the axis of rotation of the crankshaft and forms an angle with it, with a driving device producing the closing and opening motion of the deep rolling apparatus as well as the deep rolling force, and where there is provided an axial guide roller which has a diameter that is slightly smaller than the space between two oil collars of a main or crank pin journal of a crankshaft and which has a distance to the plane containing the axes of rotation of the two support rollers wherein for a scissor type construction of the deep rolling apparatus the axial guide roller is provided on the deep rolling head and is centered relative thereto, its axis of rotation being perpendicular to the axis of rotation of the crankshaft and forms a sharp angle with a common plane of the axes of the two support rollers.

2. Deep rolling apparatus as in claim 1, wherein the axial guide roller is cylindrical or crowned on the outside.

3. Deep rolling apparatus as in claim 1, wherein the axial guide roller comprises a pair of rollers or a pair of sliding bodies.

4. Deep rolling apparatus of a deep rolling machine for crankshafts in which two arms cross from each other bear a deep rolling head or a support roller head, whereby the support roller head is provided with two supporting rollers having parallel axes and the deep rolling head is provided with at least one work roller whose axis of rotation has the same direction as the axis of rotation of the crankshaft and forms an angle with it, with a driving device producing the closing and opening motion of the deep rolling apparatus as well as the deep rolling force, and where there is provided an axial guide roller which has a diameter that is slightly smaller than the space between two oil collars of a main or crank pin journal of a crank shaft and which has a distance to the plane containing the axes of rotation of the two support rollers, wherein for a compact construction of the deep rolling apparatus in which the two arms are connected to each other via a yoke, an axial guide roller is provided on the yoke and is centered relative to the deep rolling roller head, whereby its axis of rotation is perpendicular to the axis of rotation of the crankshaft and is parallel to the plane containing the axes of rotation of the two support rollers.

* * * * *